March 24, 1953  G. HENDRICKSON  2,632,542
FRICTION CLUTCH MECHANISM
Filed Jan. 31, 1947  2 SHEETS—SHEET 1
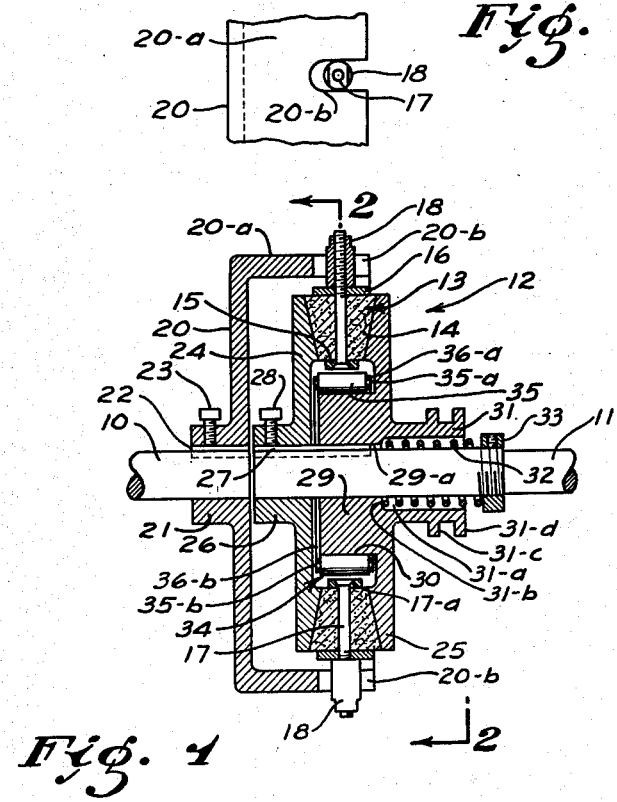
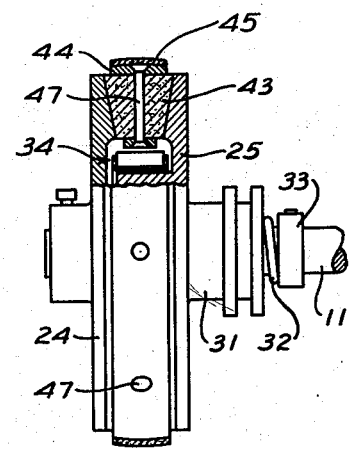
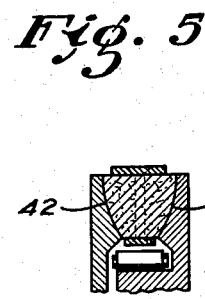
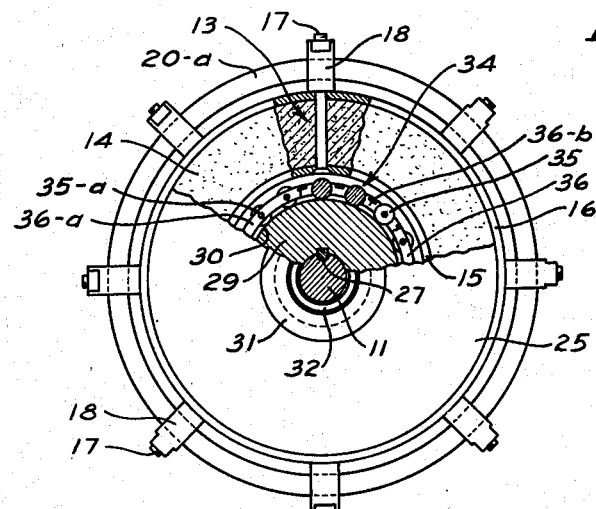
INVENTOR.
Glover Hendrickson
BY
John Flam
ATTORNEY

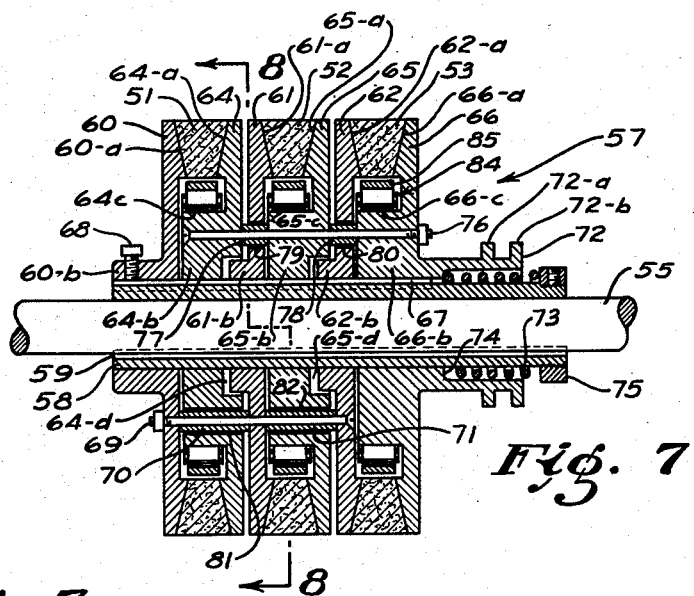

Patented Mar. 24, 1953

2,632,542

UNITED STATES PATENT OFFICE 2,632,542

FRICTION CLUTCH MECHANISM

Glover Hendrickson, Los Angeles, Calif.

Application January 31, 1947, Serial No. 725,677

8 Claims. (Cl. 192—65)

This invention relates to mechanism optionally operable for transmitting rotary motion between a pair of rotatable elements.

It is an object of this invention to provide an improved friction clutch mechanism for this purpose.

It is another object of this invention to provide such mechanism in which the engagement of the driving parts is very smooth.

It is another object of this invention to provide such mechanism comprising a V-shaped resilient band as one of the driving elements.

It is another object of this invention to provide a friction clutch that can be released and engaged by a small relative movement between the engaging elements.

It is still another object of this invention to provide such mechanism adapted to connect a pair of transversely spaced, rotatable elements in driving relation.

This invention possesses many other advantages, and has other objects which may be made more clearly apparent from a consideration of several embodiments of the invention. For this purpose there are shown a few forms in the drawings accompanying and forming part of the present specification. The forms will now be described in detail illustrating the general principles of the invention; but it is to be understood that this detailed description is not to be taken in a limiting sense, since the scope of this invention is best defined by the appended claims.

In the drawings:

Figure 1 is an axial section of a drive mechanism incorporating one form of the invention;

Fig. 2 is a cross section, partly in elevation, taken as indicated by line 2—2 of Fig. 1;

Fig. 3 is a fragmentary plan view of one of the rotatable elements of Fig. 1;

Fig. 4 is a fragmentary section, showing a modified form of the invention;

Fig. 5 is a side elevation, partly in section, showing another modified form of the invention;

Fig. 6 is an elevation of still another form of the invention;

Fig. 7 is an axial section on an enlarged scale, taken as indicated by line 7—7 of Fig. 6;

Fig. 7-a is a fragmentary sectional view showing a modified form of the invention; and Fig. 8 is a cross section, taken as indicated by line 8—8 of Fig. 7.

Referring to that form of the invention shown in Figs. 1, 2, and 3, a pair of substantially axially aligned shafts are indicated by the numerals 10 and 11, and are arranged to be connected optionally in driving relation by the friction clutch mechanism generally indicated by the numeral 12. This mechanism comprises a circular friction band structure 13 which extends about the shaft axis, and comprises a V-shaped, resilient ring 14 of any suitable material, such, for example, as fabric belting material, leather, or the like.

The ring 14 is confined between inner and outer reinforcing bands 15 and 16 secured in place by a plurality of radially extending bolts 17. Each bolt 17 has a countersunk head 17-a at its inner end, accommodated in a suitable recess in the inner band 15, and is threaded for receiving an elongated cylindrical nut 18 on its outer end.

The band 13 is in continuous driving relation with the shaft 10, and is arranged to be connected optionally in driving relation with the shaft 11.

Thus, a spider 20 is fixed on the shaft 10 against axial or angular movement with respect thereto in any suitable manner, as by a key 22 and set screw 23 accommodated in a hub 21. The spider 20 has an exterior cylindrical flange 20-a with a plurality of axially extending slots 20-b therein opening through the free edge of the flange. These slots 20-b correspond in number and angular spacing with the bolts 17 and have a width equal to the diameter of the nuts 18. Thus, the friction ring 13, when assembled with the spider 20, is confined by the engagement of the nuts 18 and slots 20-b to move angularly with the spider but is otherwise unrestrained thereby.

The means for connecting the friction band 13 in driving relation with the shaft 11 comprises a pair of relatively axially movable members 24 and 25 having respectively opposed, oppositely inclined, annular faces for engaging respectively the faces of the ring 14. The member 24 has a hub 26 which accommodates a long key 27 provided in the shaft 11, the member 24 thus being angularly restrained on the shaft. The hub 26 also has a set screw 28 which, by engagement with the key 27, secures the key, as well as member 24, against axial movement on the shaft 11.

The cooperating member 25 has an enlarged hub 29 extending toward the member 24, and providing an exterior cylindrical surface 30 within the ring 14, for a purpose to be presently described. The member 25 is angularly confined on the shaft 11, but is free to move axially thereon, as by a key-way 29-a slidingly engaging the key 27. The member 25 also has an outwardly extending hub 31 providing an annular space 31-a about the shaft 11 for accommodating a compression spring 32 confined between a shoulder 31-b at the inner end of space 31-a and a collar 33 adjustably secured on the shaft 11.

The arrangement is such that movement of the member 25 toward the member 24, in response to the force exerted by the spring 32, serves to confine the ring 14 between the members and in driving relation therewith. The inclination of the contacting faces causes radial forces in response to the axial force exerted by the spring 32, urging an increase in the diameter of the ring 14. The resistance of the ring to such increase in diameter maintains the ring 14 in frictional engagement with the members 24 and 25.

Since the friction band 13 is unconfined, except as to angular movement about the shaft 11, it can adapt itself accurately between the members 24 and 25, ensuring a good driving connection and avoiding the necessity of accurate axial alignment of the shafts 10 and 11.

Means are provided for moving the members 24 and 25 apart to release the band 13. For this purpose, a pair of spaced flanges 31-c and 31-d are provided on the hub 31 of the member 25 for receiving a conventional clutch yoke or thrust collar (not shown). In this way, a force may be applied to the member 25 to overcome the force of spring 32 and move member 25 away from the cooperating member 24. When the member 25 is released, it is urged toward the member 24 by the spring 32 and reengages the band 13. Due to the resilience of the ring 14, such engagement occurs very smoothly. Only a very small movement of member 25 is required to engage or disengage the clutch.

A roller bearing structure 34 is provided for supporting the band 13 when released by separation of the members 24 and 25. This bearing structure 34 is shown as comprising a plurality of rollers 35 confined to roll in angularly spaced relation on the hub surface 30 by a cage 36. This cage comprises a pair of spaced rings 36-a and 36-b with suitable openings for accommodating pintles 35-a and 35-b at the opposite ends of the rollers 35.

The exterior diameter of the bearing structure 34 is somewhat less than the inside diameter of the friction band 13, permitting the ring 14 to adjust its position as required when engaged by the members 24 and 25. When these members release the ring 14, the band 13 drops to rest on the bearing 34. In this way, the mechanism 12, when not connecting the shafts 10 and 11 in driving relation, exerts practically no restraint on relative rotation between the shafts.

It may be advantageous to provide friction faces other than conical, as shown in the form just described. For example, these faces may be oppositely curved in a plane passing through the axis of rotation, as shown at 41 and 42 in Fig. 4.

A friction band, similar to band 13, may be connected in continuous driving relation with an element corresponding to shaft 10 by the other means than that in the form of Figs. 1, 2, and 3. Thus, in Fig. 5, a friction band 43 is shown which is substantially identical with the previously described band 13, except that the outer reinforcing band 44 is crowned for the reception of a flat belt 45, the fastening elements 47 being countersunk at both ends.

It is to be understood that belt 45 serves to connect the band 43 in driving relation with an element rotatable about an axis parallel with and spaced from the axis of shaft 11 and carrying a pulley or other means for accommodating the belt 45. Members 24 and 25 serve optionally to couple the band 43 in driving relation with shaft 11, as before.

It is not necessary in all cases that the friction band comprise a ring. By appropriate design such a band may serve additionally as a belt to connect in driving relation a pair of rotatable elements having spaced axis. Thus, a single element may serve the combined functions of the band 43 and belt 45 of Fig. 5.

In Figs. 6, 7, and 8, an arrangement is shown in which a plurality of V-belts 51, 52, and 53 are adapted to connect shafts 54 and 55 in driving relation by engagement with clutch elements 56 and 57, respectively, fixed on the shafts. By appropriate design of one of the elements, for example, the one marked 57, the belts 51, 52, and 53 may serve additionally as friction means to permit the shafts 54 and 55 optionally to be placed into or out of driving connection.

Referring particularly to Fig. 6, the pulley structure 57 is shown as assembled in its entirety on a sleeve 58 for mounting as a unit on the shaft 55, a key 59 serving to fix the sleeve 58 on the shaft 55.

The clutch element 57 comprises a plurality of axially fixed pulley sections or members 60, 61, and 62, having inclined belt-engaging faces 60-a, 61-a, and 62-a respectively, for engaging corresponding sides of belts 51, 52, and 53, and axially movable pulley sections or members 64, 65, and 66. The movable pulley sections 64, 65, and 66 have belt-engaging faces 64-a, 65-a, and 66-a respectively, opposing the faces 60-a, 61-a, and 62-a, and inclined in the opposite direction. The belts 51, 52, and 53 have their sides similarly inclined, and are accommodated respectively between pulley sections 60 and 64, 61 and 65, and 62 and 66. By urging the cooperating pulley sections together, they are caused to grip the respective belts so as to be in driving relation therewith; by urging the pulley sections apart, the belts are released, and are no longer in driving relation therewith.

A long key 67 serves to prevent relative rotation between the sleeve 58 and the pulley sections 60, 61, 62, 64, 65, and 66. The outermost fixed pulley section 60 has a hub 60-b engaging the sleeve 58 and provided with a set screw 68 for engaging the key 67, thus securing the pulley section, as well as the key 67, axially on the sleeve 58. The other fixed pulley sections 61 and 62 have similar hubs 61-b and 62-b for engaging the sleeve and the key 67, and are maintained in fixed axial position by means of through bolts 69, which extend between sections 60 and 62 and tubular spacers 70 and 71, and which are interposed between sections 60 and 61 and sections 61 and 62 respectively.

The movable pulley sections 64, 65 and 66 have large hubs 64-b, 65-b, and 66-b respectively, extending toward the cooperating fixed sections and providing exterior cylindrical surfaces 64-c, 65-c, and 66-c. The hubs 64-b and 65-b have recesses 64-d and 65-d for respectively accommodating hubs 61-b and 62-b, while the outermost section 66 has an outwardly projecting hub 72 providing an annular space for accommodating a compression spring 73 confined between the inner end 74 of said space and a collar 75 threaded on sleeve 58.

The movable sections 64, 65, and 66 are maintained in fixed axial relation with respect to each other, as by bolts 76 joining the sections 64 and 66, and spacers 77 and 78 between sections 64 and 65, and sections 65 and 66 respectively. Appropriate clearance holes 79 and 80 are provided in sections 61 and 62 for these spacers.

Similarly, clearance holes 81 and 82 are provided in sections 64 and 65 for spacers 70 and 71.

V-belts 51, 52, and 53 might well take the form shown at 51-a in Fig. 7-a of the drawings, with a corresponding change in shape of the cooperating adjacent pulley sections 51-b and 51-c. Further, the rounded external surface presented by the belt 51-a would be better adapted to receive an idler pulley, not shown, should such device be used to engage and release the belt portions from their cooperating surfaces.

The operation of this form of the invention is quite similar to that of Fig. 1. Thus, the spring 73 urges the sections 64, 65, and 66 toward the sections 60, 61, and 62, the inclined belt-engaging urging the respective belts 51, 52, and 53 radially outward, the belt tension opposing such outward movement and causing the belts to grip frictionally the respective pulley sections.

The hub 72 has spaced flanges 72-a and 72-b thereon for accommodating a conventional thrust collar (not shown) by means of which force may be exerted to overcome the pressure of spring 73 and move the pulley sections apart to release the belts.

Means are provided to support the belts 51, 52, and 53 upon separation of the pulley sections to ensure complete release of the belts. Thus, a roller bearing structure 84, which may be substantially identical with the bearing structure 34 previously described, is provided on each of the cylindrical surfaces 64-c, 65-c, and 66-c, and carries a ring 85 suitably spaced from the inside surface of the respective belt when the belt is in driving relation with respect to the pulley sections. When the belt is released, it moves inwardly so that it rests on the ring 85.

Although the arrangement utilizing the belt as the friction band is shown and described as having multiple belts, it will be obvious that, by slight modification, an arrangement utilizing a single belt could be provided. Conversely, the arrangement of Fig. 1 utilizing a single friction band could be modified, in accordance with the teaching of Fig. 6, to employ a plurality of friction bands, should such an arrangement be desired.

The inventor claims:

1. In a friction drive mechanism for connecting a pair of rotatable elements in driving relation: a radially distortable elastic annular friction band extending about one of said elements; said band having oppositely inclined lateral friction cases whereby pressure on said faces radially distorts said band; means connecting said band in driving relation with the other element; a pair of relatively axially adjustable members in fixed driving relation with said one element, adjustment of said members serving to grip said lateral friction faces respectively for connecting said band in driving relation with said one element; and bearing means for contacting and movably supporting said band with respect to said one element when said axially adjustable members are out of gripping relation with said band.

2. In a friction drive mechanism for connecting in driving relation, a pair of substantially axially aligned, rotatable elements: an annular friction band extending about one of said elements; means connecting said band in driving relation with the other element to restrict relative angular movement between said other element and the band, and permitting relative radial movement between the band and the element to which it is connected; means carried by said one element for frictionally engaging said band to couple said one element and said band in driving relation; and means for supporting said band when released in substantially coaxial relation with said one element, said supporting means permitting free relative rotation between said band and said element.

3. In a friction drive mechanism for connecting in driving relation, a pair of substantially axially aligned, rotatable elements: a friction band extending about one of said elements and having oppositely inclined annular friction faces; a pair of relatively axially adjustable members fixed in driving relation on said element and adapted to engage respectively said faces to couple said band in driving relation with said element; and means connecting said band in driving relation with the other element to restrict relative angular movement between said other element and the band, and permitting relative radial movement between the band and the element to which it is connected.

4. In a friction drive mechanism for connecting in driving relation, a pair of substantially axially aligned, rotatable elements: a friction band extending about one of said elements and having oppositely inclined annular friction faces; a pair of relatively axially adjustable members fixed in driving relation on said element and adapted to engage respectively said faces to couple said band in driving relation with said element; means forming driving projections on said band; and means in driving relation with the other element engaging said projections to restrict relative angular movement between said element and said band and permitting relative radial movement between the band and the element to which it is connected.

5. In a friction drive mechanism for connecting in driving relation, a pair of substantially axially aligned, rotatable elements: a friction band extending about one of said elements and having oppositely inclined annular friction faces; a pair of relatively axially adjustable members fixed in driving relation on said element and adapted to engage respectively said faces to couple said band in driving relation with said element; means forming driving projections on said band; means in driving relation with the other element engaging said projections to restrict relative angular movement between said element and said band and permitting relative radial movement between the band and the element to which it is connected; and bearing means between said members for supporting said band when released.

6. In a friction drive mechanism for connecting in driving relationship a pair of rotatable elements, the axes of which may be misaligned: a radially distortable elastic annular friction band extending about one of said elements; said band having a pair of oppositely inclined lateral friction faces whereby pressure on said faces radially distorts said band; means connecting said band for angular movement with the other element, but permitting radial distortion of said band with respect thereto; and a pair of relatively axially adjustable members in fixed driving relation with said one element, adjustment of said members serving to grip said lateral friction faces for connecting said band in driving relation with said one element.

7. In a friction driving mechanism for connecting a pair of rotatable elements in driving relation: an annular friction band extending about one of said elements; bearing means for movably supporting said band with respect to said one element; means connecting said band in driving relation with the other element; a pair of relatively axially adjustable members in fixed driving relation with said one element; and spring means urging said axially adjustable members into gripping engagement with said band.

8. In a friction drive mechanism for connecting in driving relationship a pair of rotatable elements, the axes of which may be misaligned: a radially distortable elastic annular friction band extending about one of said elements; said band having a pair of oppositely inclined lateral friction faces whereby pressure on said faces radially distorts said band; means connecting said band for angular movement with the other element, but permitting radial distortion of said band with respect thereto; a pair of relatively axially adjustable members in fixed driving relation with said one element, adjustment of said members serving to grip said lateral friction faces for connecting said band in driving relation with said one element; and bearing means for contacting and movably supporting said band with respect to said one element when said axially adjustable members are out of gripping relation with said band.

GLOVER HENDRICKSON.

REFERENCES CITED

The following references are of record in the file of this patent:

UNITED STATES PATENTS

| Number | Name | Date |
|---|---|---|
| 456,571 | Hosford | July 28, 1891 |
| 488,390 | Gordon | Dec. 20, 1892 |
| 600,178 | Sholl | Mar. 8, 1898 |
| 771,652 | Mocomber et al. | Oct. 4, 1904 |
| 2,180,217 | Thomas | Nov. 14, 1939 |
| 2,182,956 | Beyerline | Dec. 12, 1939 |
| 2,229,754 | Le Tourneau | Jan. 28, 1941 |
| 2,259,149 | Cederstone | Oct. 14, 1941 |